(12) United States Patent
Moriguchi et al.

(10) Patent No.: US 9,695,340 B2
(45) Date of Patent: *Jul. 4, 2017

(54) LOW TEMPERATURE HOT MELT ADHESIVE FOR HIGH-SPEED COATING AND SPIRAL COATING

(71) Applicant: HENKEL AG & CO. KGAA, Duesseldorf (DE)

(72) Inventors: Masahiro Moriguchi, Osaka (JP); Shigekazu Saito, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/211,329

(22) Filed: Mar. 14, 2014

(65) Prior Publication Data

US 2014/0199545 A1    Jul. 17, 2014

Related U.S. Application Data

(63) Continuation of application No. PCT/JP2012/074134, filed on Sep. 13, 2012.

(30) Foreign Application Priority Data

Sep. 16, 2011    (JP) ................. 2011-203063

(51) Int. Cl.
  *C09J 123/12*  (2006.01)
  *C09J 7/02*    (2006.01)
  *C09J 11/06*   (2006.01)
  *C09J 123/08*  (2006.01)

(52) U.S. Cl.
  CPC .......... *C09J 123/12* (2013.01); *C09J 7/0203* (2013.01); *C09J 11/06* (2013.01); *C09J 123/08* (2013.01); *C08L 2314/06* (2013.01); *Y10T 428/2826* (2015.01)

(58) Field of Classification Search
  CPC ...... C08L 23/12; C08L 51/00; C08L 23/0815; C08L 2314/06; C09J 123/12; C09J 151/00; C09J 11/06; C09J 123/08; C09J 7/0203
  USPC ................... 428/343, 346; 442/58, 149, 150
  See application file for complete search history.

(56) References Cited

U.S. PATENT DOCUMENTS

| | | | |
|---|---|---|---|
| 4,286,077 A | 8/1981 | St. Clair et al. | |
| 4,361,672 A | 11/1982 | Agarwal et al. | |
| 5,418,052 A | 5/1995 | Sugie et al. | |
| 6,099,900 A | 8/2000 | Minamizaki | |
| 6,184,285 B1 | 2/2001 | Hatfield et al. | |
| 6,627,723 B2 | 9/2003 | Karandinos et al. | |
| 6,747,114 B2 | 6/2004 | Karandinos et al. | |
| 6,887,941 B2 | 5/2005 | Zhou | |
| 7,459,503 B2 | 12/2008 | Kanamaru et al. | |
| 7,825,186 B2 | 11/2010 | Bach et al. | |
| 8,366,865 B2 | 2/2013 | Terfloth et al. | |
| 8,604,145 B2 | 12/2013 | Boone et al. | |
| 8,653,169 B2 | 2/2014 | Jiang et al. | |
| 2004/0039117 A1 | 2/2004 | Kijima | |
| 2005/0014891 A1 | 1/2005 | Quinn | |
| 2005/0059759 A1 | 3/2005 | Sajot et al. | |
| 2005/0159566 A1 | 7/2005 | Minami et al. | |
| 2007/0117907 A1 | 5/2007 | Bach et al. | |
| 2008/0081868 A1 | 4/2008 | Jiang et al. | |
| 2009/0110925 A1 | 4/2009 | Fukuda et al. | |
| 2010/0305259 A1* | 12/2010 | Rodriguez et al. ........... 524/504 |
| 2011/0021102 A1 | 1/2011 | Inoue et al. | |
| 2013/0296476 A1 | 11/2013 | Yasui et al. | |
| 2014/0199907 A1 | 7/2014 | Moriguchi et al. | |
| 2015/0017868 A1 | 1/2015 | Stafeil et al. | |

FOREIGN PATENT DOCUMENTS

| | | |
|---|---|---|
| EP | 0285430 A2 | 10/1998 |
| EP | 1498432 A1 | 1/2005 |
| EP | 1637559 A1 | 3/2006 |
| EP | 2113541 A1 | 11/2009 |
| EP | 2290029 A1 | 3/2011 |
| EP | 2081609 B1 | 3/2012 |
| EP | 1498434 B1 | 10/2013 |
| JP | 60120775 A | 6/1985 |
| JP | 4077591 A | 3/1992 |
| JP | 200196490 A | 4/2001 |
| JP | 2002519474 A | 7/2002 |
| JP | 2004137297 A | 5/2004 |
| JP | 2007169531 A | 7/2007 |
| JP | 2009242533 A | 10/2009 |
| JP | 2011511866 A | 4/2011 |
| JP | 2012187361 A | 10/2012 |
| WO | 0146278 A2 | 6/2001 |
| WO | 0153408 A1 | 7/2001 |
| WO | 0196490 A | 12/2001 |
| WO | 2006004750 A1 | 1/2006 |
| WO | 2012068576 A2 | 5/2012 |
| WO | 2012068703 A1 | 5/2012 |

* cited by examiner

*Primary Examiner* — Arti Singh-Pandey
(74) *Attorney, Agent, or Firm* — Sun Hee Lehmann

(57) ABSTRACT

The present invention provides a hot melt adhesive for high-speed coating and spiral coating at low temperature. The hot melt adhesive has excellent adhesion to polyethylene and nonwoven fabric, and is suitable for disposable products. The hot melt adhesive comprises: (A) a propylene homopolymer having a melting point of 100° C. or lower which is obtainable by polymerizing propylene using a metallocene catalyst; and (B) an ethylene-based copolymer.

23 Claims, No Drawings

LOW TEMPERATURE HOT MELT ADHESIVE FOR HIGH-SPEED COATING AND SPIRAL COATING

FIELD OF THE INVENTION

The present invention relates to a hot melt adhesive, and more particularly to a hot melt adhesive which is used in the field of disposable products typified by a diaper and a napkin.

BACKGROUND OF THE INVENTION

A synthetic rubber-based hot melt adhesive containing a thermoplastic block copolymer as a main component has widely been used as a hot melt adhesive which is used in disposable products such as a diaper and a napkin and is applied to a base material thereof, for example, a nonwoven fabric, a tissue, a polyethylene film and the like.

In case of producing the disposable products, a film or a nonwoven fabric is coated with a hot melt adhesive, and high-speed coating is sometimes employed so as to enhance the production efficiency of the disposable products. However, the synthetic rubber-based hot melt adhesive may be sometimes scattered when applied at a high speed.

One of means for enhancing the production efficiency of the disposable products includes a method in which an olefin-based hot melt adhesive typified by an ethylene-propylene copolymer is applied at a high speed.

WO 2003/087172 A1, JP 2003-533551 A and JP 2003-518171 A disclose a hot melt adhesive containing an olefin polymer as a main component. It is known that an olefin-based hot melt adhesive is commonly more suitable for use in paper processing than use in disposable products.

WO 2003/087172 A1 discloses that a propylene polymer is used as a raw material for a hot melt adhesive. However, the hot melt adhesive of Patent Literature 1 does not have sufficient adhesion to a polyethylene film. A diaper, a sanitary napkin and the like often have a structure in which an absorber constituted by a pulp, an absorbent polymer and the like is wrapped in a tissue and the outside thereof is covered with a nonwoven fabric, a polyethylene film and the like. Therefore, it is required for the hot melt adhesive for disposable products to have a strong adhesive strength to the polyethylene film.

JP 2003-533551 A discloses a polyolefin-based hot melt adhesive for disposable products. In case of spiral coating of a polyethylene film with the hot melt adhesive of JP 2003-533551 A, it is necessary to decrease the viscosity by increasing a coating temperature so as to cope with a complicated coating pattern. As shown in JP 2003-533551 A, the coating temperature of the hot melt adhesive is set to high temperature (350° F. to 365° F.). However, when the polyethylene film is coated with the hot melt adhesive at the above temperature, the film would be melted and the coated hot melt adhesive would shrink due to cooling, resulting in the formation of wrinkles in the film.

JP 2003-518171 A discloses a propylene-based hot melt adhesive. However, it is also difficult for the hot melt adhesive of JP 2003-518171 A to be applied by spiral coating at low temperature, as is the case with the hot melt adhesive of JP 2003-533551 A, and also it is hardly to say that the peel strength between nonwoven fabrics is sufficient.

Object of the Invention

An object of the present invention is to provide a hot melt adhesive, which is excellent in high-speed coating and spiral coating at low temperature and is also excellent in adhesion to polyethylene and a nonwoven fabric; and disposable products obtainable by the hot melt adhesive.

The present inventors have intensively studied and found that it is possible to obtain a hot melt adhesive which is excellent in high-speed coating and is excellent in spiral coating at low temperature, and is also excellent in adhesion to polyethylene and a nonwoven fabric, when a propylene homopolymer having narrow molecular weight distribution and also having a low melting point is blended with an ethylene-based copolymer, and that such a hot melt adhesive is suitable for disposable products. Thus, the present invention has been completed.

Furthermore, the present inventors has found that, when an ethylene/octene copolymer is used as the ethylene-based copolymer which is a component to be blended in the hot melt adhesive, a coating pattern of the hot melt adhesive becomes inconspicuous, resulting in satisfactory appearance of the disposable products.

That is, the present invention provides a hot melt adhesive including: (A) a propylene homopolymer having a melting point of 100° C. or lower which is obtainable by polymerizing propylene using a metallocene catalyst; and (B) an ethylene-based copolymer.

The present invention provides the hot melt adhesive, in an embodiment, wherein the ethylene-based copolymer (B) is an ethylene/α-olefin copolymer which is obtainable by polymerization using a metallocene catalyst.

The present invention provides, as a preferred embodiment, the hot melt adhesive, wherein the ethylene/α-olefin copolymer (B) contains at least one selected from an ethylene/propylene copolymer and an ethylene/octene copolymer.

The present invention provides, as another embodiment, the hot melt adhesive, further including: (C) a tackifier resin; and (D) an oil.

The present invention provides, as still another embodiment, the hot melt adhesive including: (E) a wax, wherein the wax (E) includes a wax modified with carboxylic acid and/or carboxylic anhydride.

The present invention provides, as another preferred embodiment, the hot melt adhesive having a melt viscosity at 150° C. of 7,000 mPa·s or less.

The present invention provides, as a second aspect, disposable products obtainable by using the above hot melt adhesive.

SUMMARY OF THE INVENTION

Since the hot melt adhesive of the present invention includes: (A) a propylene homopolymer having a melting point of 100° C. or lower which is obtainable by polymerizing propylene using a metallocene catalyst; and (B) an ethylene-based copolymer, the hot melt adhesive is excellent in high-speed coating and spiral coating at low temperature, and is also excellent in adhesion to a polyethylene film and a nonwoven fabric.

When the ethylene-based copolymer (B) is an ethylene/α-olefin copolymer which is obtainable by polymerization using a metallocene catalyst, the hot melt adhesive is more excellent in adhesion to a polyethylene film and a nonwoven fabric while maintaining the high-speed coatability and the spiral coatability at low temperature.

In the hot melt adhesive of the present invention, when the ethylene/α-olefin copolymer (B) contains at least one selected from an ethylene/propylene copolymer and an ethylene/octene copolymer, the spiral coatability at low temperature is more improved. When the ethylene/octene copolymer is contained, a coating pattern of the adhesive becomes inconspicuous in case of coating adherends such as a polyethylene film and a nonwoven fabric by means of spiral coating.

When the hot melt adhesive of the present invention further includes: (C) a tackifier resin; and (D) an oil, the hot melt adhesive becomes more excellent in adhesion to a polyethylene film and a nonwoven fabric while maintaining the high-speed coatability and the spiral coatability at low temperature.

When the hot melt adhesive of the present invention includes: (E) a wax, and the wax (E) is a wax modified with carboxylic acid and/or carboxylic anhydride, the hot melt adhesive becomes still more excellent in adhesion to a polyethylene film and a nonwoven fabric while maintaining the high-speed coatability and the spiral coatability at low temperature.

When the hot melt adhesive of the present invention has a melt viscosity at 150° C. of 7,000 mPa·s or less, it becomes possible to be applied by spiral coating at low temperature of about 150° C. and a film as an adherend is less likely to be melted at high temperature, and also the film is less likely to shrink even though the temperature of the adhesion part of the film decreases.

Since the disposable products of the present invention are obtainable using the above hot melt adhesive, it is efficiently produced in a high-speed coating line. Because of low temperature of about 150° C., the coating line achieves high safety and peeling of a nonwoven fabric and a film does not occur. The coating pattern is less likely to be conspicuous, resulting in excellent appearance.

DETAILED DESCRIPTION OF THE INVENTION

The hot melt adhesive according to the present invention contains, as essential components, two components: (A) a propylene homopolymer having a melting point of 100° C. or lower which is obtainable by polymerizing propylene using a metallocene catalyst; and (B) an ethylene-based copolymer.

In the present invention, the propylene homopolymer (A) refers to a homopolymer of propylene, which is produced by using a metallocene catalyst as a polymerization catalyst. The melting point of the propylene homopolymer (A) is 100° C. or lower, more preferably from 60 to 90° C., and most preferably from 65 to 85° C.

The melting point refers to a value measured by differential scanning calorimetry (DSC). Specifically, after weighing 10 mg of a sample in an aluminum container, the measurement is carried out at temperature rise rate of 5° C./minute using DSC6220 (trade name) manufactured by SII NanoTechnology Inc, and the temperature of a top of a fusion peak refers to the melting point.

When propylene is polymerized using a metallocene catalyst, a propylene homopolymer having (i) crystallinity and (ii) very narrow molecular weight distribution is synthesized.

The above (i) means that complete isotacticity and syndiotacticity can be optionally controlled. Therefore, a polymer, in which arrangement, ratio and the like of methyl groups is uniform, is obtained without causing deviation of crystallinity, and a low crystalline site that can cause decrease in adhesive force is less likely to be formed.

With respect to (ii), when molecular weight distribution of the propylene homopolymer (A) is indicated by polydispersity (Mw/Mn), it is from 1.0 to 3.0. The propylene homopolymer having polydispersity of 1.0 to 3.0 is excellent in adhesion. The molecular weight distribution is a concept which indicates distribution of a molecular weight of a synthetic polymer, and a ratio (Mw/Mn) of a weight average molecular weight (Mw) to a number average molecular weight (Mn) serves as an indicator. In the present invention, the molecular weight distribution is measured by gel permeation chromatography (GPC).

Examples of the propylene homopolymer (A) include: (A1) a propylene homopolymer having a weight average molecular weight of 60,000 or less; and (A2) a propylene homopolymer having a weight average molecular weight of more than 60,000.

The weight average molecular weight of the propylene homopolymer (A1) is preferably from 30,000 to 60,000, and particularly preferably from 30,000 to 55,000.

The weight average molecular weight of the propylene homopolymer (A2) is more than 60,000, preferably more than 60,000 and 90,000 or less, and more preferably more than 60,000 and 80,000 or less.

Examples of a commercially available product of the propylene homopolymer (A1) include L-MODU X400S (trade name) manufactured by Idemitsu Kosan Co., Ltd., and examples of a commercially available product of the propylene homopolymer (A2) include L-MODU X600S (trade name) manufactured by Idemitsu Kosan Co., Ltd.

In the present invention, the propylene homopolymer (A) preferably contains the propylene homopolymer (A1), and also may contain the (A2).

The propylene homopolymer (A) may not contain the propylene homopolymer (A1), and may contain only the propylene homopolymer (A2).

In the present invention, the amount of the propylene homopolymer (A) is preferably from 60 to 95 parts by weight, and particularly preferably from 70 to 90 parts by weight, based on 100 parts by weight of the total weight of the propylene homopolymer (A) and the ethylene-based copolymer (B).

When the propylene homopolymer (A) contains both the propylene homopolymer (A1) and the propylene homopolymer (A2), a weight ratio of both polymer is preferably from 1:3 to 3:2 ((A1):(A2)).

The weight average molecular weight (Mw) means a value measured by gel permeation chromatography (GPC). Specifically, the value can be measured by using the following apparatus and measuring method. RI manufactured by Wators Corporation is used as a detector. TSKGEL GMHHR-H(S) HT manufactured by TOSOH CORPORATION is used as a GPC column. A sample is dissolved in 1,2,4-trichlorobenzene and allowed to flow at a flow rate of 1.0 ml/min and a measuring temperature of 145° C., and then the weight average molecular weight is determined by conversion of a molecular weight using a calibration curve derived based on polypropylene.

Since the number average molecular weight (Mn) is also determined by the same method, the molecular weight distribution is also calculated by GPC.

When the hot melt adhesive of the present invention contains the propylene homopolymer (A1), spiral coatability at low temperature is improved while maintaining adhesion to a polyethylene film and a nonwoven fabric.

In the present invention, the ethylene-based copolymer (B) refers to a copolymer of ethylene and a copolymerizable monomer which is copolymerizable with ethylene.

Examples of the copolymerizable monomer include:

α-olefin such as ethylene, propylene, octene and butene;

carboxylic acid (esters) such as vinyl acetate, (meth)acrylic acid, (meth)acrylic acid ester, maleic acid and maleic acid ester;

carboxylic anhydrides such as maleic anhydride, phthalic anhydride and succinic anhydride; and the like.

These copolymerizable monomers may be copolymerized alone with ethylene, or two or more kinds of copolymerizable monomers may be copolymerized.

As used herein, (meth)acrylic acid refers to a concept including both methacrylic acid and acrylic acid. Specific examples of the (meth)acrylic acid ester include methyl acrylate, ethyl acrylate, n-propyl acrylate, n-butyl acrylate, isobutyl acrylate, 2-ethylhexyl acrylate, 2-hydroxyethyl acrylate, isooctyl acrylate, methyl methacrylate, ethyl methacrylate, glycidyl methacrylate and the like.

Therefore, in the present invention, examples of the ethylene-based copolymer (B) include an ethylene/α-olefin copolymer, an ethylene/carboxylic acid copolymer, an ethylene/carboxylic acid ester copolymer and an ethylene/carboxylic anhydride copolymer.

The ethylene copolymer (B) of the present invention is preferably the ethylene/α-olefin copolymer. The ethylene/α-olefin copolymer is particularly preferably an ethylene/α-olefin copolymer obtained by polymerization using a metallocene catalyst.

When the hot melt adhesive of the present invention contains the ethylene/α-olefin copolymer obtained by polymerization using a metallocene catalyst, the spiral coatability at low temperature is improved and the adhesion to a polyethylene film and a nonwoven fabric is more excellent.

Examples of the ethylene/α-olefin copolymer obtained by polymerization using a metallocene catalyst include an ethylene/propylene copolymer, an ethylene/octene copolymer, an ethylene/butene copolymer and an ethylene/propylene/butene copolymer, and the ethylene/propylene copolymer and the ethylene/octene copolymer are particularly desirable.

When the hot melt adhesive of the present invention contains at least one selected from the ethylene/propylene copolymer and the ethylene/octene copolymer, the spiral coatability at low temperature is more improved.

A melt index at 230° C. of the ethylene/propylene copolymer is preferably 200 g/10 minutes or less, more preferably from 10 to 50 g/10 minutes, and most preferably from 20 to 30 g/10 minutes. When the melt index is within the above range, the peel strength of the hot melt adhesive is improved.

As used herein, the melt index means an indicator which indicates fluidity of a resin. A given amount of a synthetic resin is heated at a prescribed temperature (for example, 230° C.) in a cylindrical vessel heated by a heater, pressurized under a prescribed load (for example, 2.16 kg) and then extruded through an opening (nozzle) provided at the bottom of the vessel, and thus the melt index is denoted by the amount of the resin extruded per 10 minutes. A unit (g/10 minutes) is used. The melt index is measured by the measuring method defined in ASTM D1238.

The hot melt adhesive containing the ethylene/octene copolymer can improve appearance of disposable products since a coating pattern of the adhesive is inconspicuous even if adherends such as a polyethylene film and a nonwoven fabric are coated by spiral coating with the adhesive.

As a preferred embodiment of the present invention, when the ethylene-based copolymer (B) is the ethylene/propylene copolymer obtained by polymerization using a metallocene catalyst, the propylene homopolymer (A) preferably contains both the propylene homopolymer (A1) and the propylene homopolymer (A2). When the component (A) and the component (B) are used in combination as mentioned above, the peel strength of the hot melt adhesive is remarkably improved.

As another preferred embodiment of the present invention, when the ethylene-based copolymer (B) is the ethylene/octene copolymer obtained by polymerization using a metallocene catalyst, the propylene homopolymer (A) preferably contains only the propylene homopolymer (A1). When the component (A) and the component (B) are used in combination as mentioned above, the coating pattern of the hot melt adhesive becomes scarcely conspicuous, and thus the appearance of disposable products is remarkably improved.

The ethylene/octene copolymer is preferably a block copolymer as compared with a random copolymer. When the ethylene/octene copolymer is a block copolymer, the hot melt adhesive excellent in peel strength is obtainable.

It is preferred that the hot melt adhesive for disposable products of the present invention further includes: (C) a tackifier resin. The tackifier resin (C) is preferably blended in the amount of 20 to 180 parts by weight, more preferably 40 to 150 parts by weight, and particularly preferably 60 to 150 parts by weight, based on 100 parts by weight of the total weight of the propylene homopolymer (A) and the wax (B).

When the tackifier resin (C) is blended in the above proportion, the hot melt adhesive can be applied by spiral coating at low temperature of 150° C. or lower. Furthermore, the hot melt adhesive can be uniformly applied to a polyethylene film and a nonwoven fabric, and thus the obtained adhesive is more suitable for the production of disposable products.

Examples of the tackifier resin (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone, or in combination. It is also possible to use, as the tackifier resin, a liquid type tackifier resin as long as it has a colorless to pale yellow color tone and has substantially no odor, and also has satisfactory thermal stability. Taking these characteristics into consideration comprehensively, the tackifier resin is preferably hydrogenated derivatives of resins, and particularly preferably a hydrogenated dicyclopentadiene-based resin.

It is possible to use, as the tackifier resin (C), commercially available products. Examples of these commercially available products include Alcon P100 (trade name) and Alcon M100 (trade name) manufactured by Arakawa Chemical Industries, Ltd.; Clearon M105 (trade name) manufactured by YASUHARA CHEMICAL CO., LTD.; ECR5400 (trade name) and ECR179EX (trade name) manufactured by Exxon Corporation; and Quinton DX390 (trade name) manufactured by Zeon Corporation. These commercially available tackifier resins can be used alone, or in combination.

The hot melt adhesive of the present invention can further include: an oil (D). The oil (D) is blended as a plasticizer for the purpose of decrease in melt viscosity of the hot melt adhesive, imparting of flexibility to the hot melt adhesive, and improvement in wettability of the hot melt adhesive to an adherend. Blending of the oil (D) enables spiral coating at low temperature.

Examples of the oil (D) include paraffin-based oils, naphthene-based oils and aromatic-based oils.

It is possible to use, as the oil (D), commercially available products. Examples thereof include Diana Fresia S32 (trade name), Diana Process Oil PW-90 (trade name) and Process Oil NS-100 (trade name) manufactured by Idemitsu Kosan Co., Ltd.; PHAZOL35 (trade name) manufactured by SK LUBRICANTS; KN4010 (trade name) manufactured by PetroChina Company; White Oil Broom 350 (trade name) and DN oil KP-68 (trade name) manufactured by Kukdong Oil & Chemical Co., Ltd.; Enerper M1930 (trade name) manufactured by BP Chemicals Ltd.; Kaydol (trade name) manufactured by Crompton Corporation; and Primol 352 (trade name) manufactured by Esso Corp. These oils (D) can be used alone, or in combination.

The hot melt adhesive of the present invention preferably contains: (E) a wax. As used herein, the "wax" refers to an organic substance having a weight average molecular weight of less than 10,000, which is solid at normal temperature and becomes liquid when heated, and is commonly considered as a "wax". There is no particularly limitation on the wax as long as the hot melt adhesive according to the present invention can be obtained, if it has wax-like properties.

The wax (E) preferably contains: (E1) an olefin wax modified with carboxylic acid or carboxylic anhydride.

In the present invention, the "(E1) olefin wax modified with carboxylic acid or carboxylic anhydride" refers to an olefin wax which is chemically or physically processed with carboxylic acid or carboxylic anhydride, and there is no particular limitation as long as the objective hot melt adhesive of the present invention is obtainable. Examples of chemical or physical processing include oxidation, polymerization, blending, synthesis and the like.

Examples of the wax (E1) include a wax which is obtainable by graft polymerization of carboxylic acid or carboxylic anhydride with an olefin wax; and a wax which is obtainable by copolymerization of carboxylic acid or carboxylic anhydride on synthesizing an olefin wax by polymerization.

Therefore, the wax may be an olefin wax which is modified as a result of introduction of carboxylic acid or carboxylic anhydride into the "olefin wax" using various reactions.

There is no particular limitation on the "carboxylic acid" and/or "carboxylic anhydride" to be used to modify the olefin wax as long as the objective hot melt adhesive of the present invention is obtainable.

Specific examples of the carboxylic acid or carboxylic anhydride include maleic acid, maleic anhydride, fumaric acid, fumaric anhydride, itaconic acid, acrylic acid, methacrylic acid and the like. These carboxylic acids and/or carboxylic anhydrides may be used alone, or in combination. Maleic acid and maleic anhydride are preferable, and maleic anhydride is particularly preferable.

The "carboxylic acid" and/or "carboxylic anhydride" to be used to modify the olefin wax refers to a wax which is obtainable by copolymerization of two or more kinds of olefins, and there is no particular limitation as long as the objective wax (E1) according to the present invention is obtainable. Therefore, a wax obtained by homopolymerization of one kind of olefin is not included in the olefin wax.

Specific examples of the olefin wax include a polyethylene wax, a polypropylene wax, a polyethylene/polypropylene wax, a polyethylene/polybutylene wax, a polyethylene/polybutene wax and the like.

Therefore, the wax (E1) in the present invention is particularly preferably a polyolefin wax modified with maleic anhydride.

The "wax (E)" can include, in addition to the wax (E1), a base wax, and specific examples thereof include:

synthetic waxes such as a Fischer-Tropsch wax, a polyolefin wax (for example, polyethylene wax, polypropylene wax, and a polyethylene/polypropylene wax);

petroleum waxes such as a paraffin wax and a microcrystalline wax; and natural waxes such as a castor wax.

The above base wax may be modified. A substance to modify the base wax may be various carboxylic acid derivatives as long as a polar group can be introduced. Examples of the "carboxylic acid derivative" include carboxylic acid esters such as ethyl acetate and vinyl acetate;

acid halides such as benzoyl bromide;

amides such as benzamide, N-methylacetamide and N,N-dimethylformamide;

imides such as succinimide;

acyl azide such as acetyl azide;

hydrazides such as propanoyl hydrazide;

hydroxamic acids such as chloroacetylhydroxamic acid;

lactones such as γ-butyrolactone; and lactams such as δ-caprolactam.

The modified base wax does not contain: the (E1) olefin wax modified with carboxylic acid or carboxylic anhydride.

In the present invention, the wax (E) preferably contains, in addition to the (E1), a Fischer-Tropsch wax (E2) mentioned as the base wax. The "(E2) Fischer-Tropsch wax" refers to a wax which is synthesized by Fischer-Tropsch method and is commonly considered as a Fischer-Tropsch wax. The Fischer-Tropsch wax is fractionated from a wax whose component molecules have comparatively wide carbon number distribution so that component molecules have narrow carbon number distribution. Examples of typical Fischer-Tropsch wax include Sasol H1 (trade name) and Sasol C80 (trade name), both of which are commercially available from Sasol Wax.

In the present invention, the melting point of the wax (E1) is preferably from 100 to 130° C., and the melting point of the base wax, preferably the wax (E2) is preferably from 60 to 90° C. The method for the measurement of the melting point is the same as that for the measurement of the melting point of the component (A).

An acid value of the wax (E) is preferably from 5 to 200 mgKOH/g, and more preferably from 20 to 160 mgKOH/g. The acid value can be measured in accordance with ASTM D1308 or BWM 3.01A.

If necessary, the hot melt adhesive according to the present invention may further contain various additives. Examples of the various additives include a stabilizing agent and a fine particle filler.

The "stabilizing agent" is blended so as to prevent decrease in molecular weight, occurrence of gelation, coloration, odor and the like of the hot melt adhesive due to heat, thereby improving stability of the hot melt adhesive, and there is no particular limitation as long as the objective hot melt adhesive of the present invention is obtainable. Examples of the "stabilizing agent" include an antioxidant and an ultraviolet absorber.

The "ultraviolet absorber" is used so as to improve light resistance of the hot melt adhesive. The "antioxidant" is used so as to prevent oxidative degradation of the hot melt adhesive. There is no particular limitation on the antioxidant and the ultraviolet absorber, as long as they are commonly used in disposable products and the below-mentioned objective disposable products are obtainable.

Examples of the antioxidant include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. These stabilizers can be used alone, or in combination.

The hot melt adhesive for disposable products of the present invention can further include a fine particle filler. The fine particle filler may be commonly used fine particle filler, and there is no particular limitation as long as the objective hot melt adhesive of the present invention can be obtained. Examples of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size (diameter in case of a spherical shape).

The hot melt adhesive for disposable products of the present invention can be produced by blending the components (A) and (B), optionally blending the components (C)-(E), if necessary blending the various additives, and melting the mixture with heating, followed by mixing. Specifically, the hot melt adhesive can be produced by charging the above components in a melt-mixing vessel equipped with a stirrer, followed by heating and mixing.

With regard to the hot melt adhesive for disposable products according to the present invention, a melt viscosity at 150° C. is preferably 7,000 mPa·s or less, more preferably from 1,000 to 6,000 mPa·s, and particularly preferably from 2,000 to 6,000 mPa·s. The "melt viscosity" is a viscosity of a melt of the hot melt adhesive and is measured by a Brookfield RVT-type viscometer (spindle No. 27).

By controlling the melt viscosity within the above range, the hot melt adhesive is more suitable for low-temperature coating. Furthermore, the hot melt adhesive is uniformly applied to a nonwoven fabric and is likely to penetrate, and thus the adhesive is more suitable for use in disposable products.

As mentioned above, the hot melt adhesive according to the present invention can also be employed in paper processing, bookbinding, disposable products and the like, and it is suitable for use in disposable products since it is excellent in adhesion to a nonwoven fabric and a polyethylene film.

The disposable products can be constituted by coating at least one kind of a member selected from a group consisting of a woven fabric, a nonwoven fabric, a rubber, a resin, papers and a polyolefin film with the hot melt adhesive according to the present invention. The polyolefin film is preferably a polyethylene film for the reason of durability, costs and the like.

There is no particular limitation on the disposable products as long as they are so-called sanitary materials. Specific examples thereof include a paper diaper, a sanitary napkin, a pet sheet, a hospital gown, a surgical white garment and the like.

In the production line of the disposable products, various members (for example, tissue, cotton, nonwoven fabric, polyolefin film, etc.) of the disposable products are commonly coated with the hot melt adhesive. In case of coating, the hot melt adhesive may be discharged (or ejected) from various dischargers (or ejectors).

There is no particular limitation on the method of coating with the hot melt adhesive as long as the objective disposable products can be obtained. Such a coating method is roughly classified into a contact coating method and a non-contact coating method. The "contact coating" method refers to a coating method in which a discharger is brought into contact with a member or a film in case of coating with the hot melt adhesive, while the "non-contact coating" method refers to a coating method in which a discharger is not brought into contact with a member or a film in case of coating with the hot melt adhesive. Examples of the contact coating method include a slot coater coating method, a roll coater coating method and the like, and examples of the non-contact coating method include a spiral coating capable of coating in a spiral form, an omega coating or control seam coating method capable of coating in a wavy form, a slot spray coating or curtain spray coating method capable of coating in a plane form, and dot coating capable of coating in a dot form.

The hot melt adhesive of the present invention is suitable for the spiral coating. The spiral coating method is a method in which an adhesive is applied by intermittent or continuous application, wherein air is supplied to form a spiral adhesive and the adhesive is applied to a member (or a base material) without contact.

It is extremely useful for the production of the disposable products that the hot melt adhesive can be applied in a wide width by the spray coating. The hot melt adhesive capable of being applied in a wide width is capable of decreasing the coating width by adjusting pressure of the hot air.

When it is difficult to apply the hot melt adhesive in a wide width, a lot of spray nozzles for obtaining sufficient bonding area are required, and thus it is unsuitable for the production of comparatively small disposable products such as a urine collection liner, and disposable products having a complicated shape.

Therefore, the hot melt adhesive of the present invention is suitable for the disposable products since the spiral coating can be performed in a wide width.

The hot melt adhesive of the present invention is useful for the production of the disposable products because of satisfactory coatability at 150° C. or lower. In case of coating with the hot melt adhesive at a high temperature, since a polyethylene film as a base material of the disposable products may be melted and shrink thermally, the appearance of the disposable products is drastically impaired. In case of applying the hot melt adhesive at 150° C. or lower, the appearance of a nonwoven fabric and the polyethylene film as a base material of the disposable products scarcely change and thus the appearance of the products is not impaired.

The hot melt adhesive of the present invention is suitable for the production of the disposable products within a short time since it is excellent in high-speed coatability. When the base material to be transported at a high speed is coated with the hot melt adhesive, breakage of the base material due to friction sometimes arises in the contact type coating method. The hot melt adhesive of the present invention is suitable for the spiral coating as a kind of non-contact coating and is therefore suited for high-speed coating, and thus it is possible to improve production efficiency of the disposable products. Furthermore, the hot melt adhesive of the present invention suited for high-speed coating minimizes disorder of the coating pattern.

The hot melt adhesive of the present invention has satisfactory thermal stability and is uniformly melted in a high-temperature tank at from 100 to 200° C. and does not cause phase separation. A hot melt adhesive having poor thermal stability easily cause phase separation of components in the high-temperature tank. The phase separation can cause clogging of a tank filter and a transfer piping.

Main embodiments of the present invention are shown below.

1. A hot melt adhesive including: (A) a propylene homopolymer having a melting point of 100° C. or lower which is obtainable by polymerizing propylene using a metallocene catalyst; and (B) an ethylene-based copolymer.
2. The hot melt adhesive according to the above 1, wherein the ethylene-based copolymer (B) is an ethylene/α-olefin copolymer which is obtainable by polymerization using a metallocene catalyst.
3. The hot melt adhesive according to the above 2, wherein the ethylene/α-olefin copolymer (B) contains at least one selected from an ethylene/propylene copolymer and an ethylene/octene copolymer.
4. The hot melt adhesive according to any one of the above 1 to 3, further including: (C) a tackifier resin; and (D) an oil.
5. The hot melt adhesive according to any one of the above 1 to 4, further including: (E) a wax, wherein the wax (E) includes a wax modified with carboxylic acid and/or carboxylic anhydride.
6. The hot melt adhesive according to any one of the above 1 to 5, wherein the adhesive has a melt viscosity at 150° C. of 7,000 mPa·s or less.
7. Disposable products obtainable by using the hot melt adhesive according to any one of the above 1 to 6.

EXAMPLES

The present invention will be descried for the purpose of describing the present invention in more detailed and specific manner by way of Examples. These are exemplary of the present invention and are not to be considered as limiting.

Components for blending (or formulating) a hot melt adhesive are shown below.

(A) Propylene homopolymer having a melting point 100° C. or lower which is obtained by polymerization using a metallocene catalyst (A1) Propylene homopolymer having a melting point of 75° C. and a weight average molecular weight of 45,000, manufactured by Idemitsu Kosan Co., Ltd. under the trade name of "L-MODU X400S"

(A2) Propylene homopolymer having a melting point of 80° C. and a weight average molecular weight of 70,000, manufactured by Idemitsu Kosan Co., Ltd. under the trade name of "L-MODU X600S"

(A'3) Propylene homopolymer having a melting point of 145° C. obtained by polymerization using a metallocene catalyst, manufactured by Clariant K.K. under the trade name of "Pliocene PP6102"

(A'4) Propylene homopolymer having a melting point of 145° C. obtained by polymerization using a Ziegler-Natta catalyst, manufactured by Eastman Chemical Company under the trade name of "Eastoflex P1010"

(A'5) Polyethylene homopolymer having a melting point of 128° C. obtained by polymerization using a metallocene catalyst, manufactured by Clariant K.K. under the trade name of "Licocene PE4201 GR"

(B) Ethylene-based copolymer (B1) Propylene/ethylene copolymer having a melt index of 200 (g/10 minutes: 230° C.) obtained by polymerization using a metallocene catalyst, manufactured by Exxon Mobil Corporation under the trade name of "Vistamaxx 2330"

(B2) Propylene/ethylene copolymer having a melt index of 20 (g/10 minutes: 230° C.) obtained by polymerization using a metallocene catalyst, manufactured by Exxon Mobil Corporation under the trade name of "Vistamaxx 6202"

(B3) Propylene/ethylene copolymer (having a random copolymerization structure of propylene/ethylene) having a melt index of 25 (g/10 minutes: 230° C.) obtained by polymerization using a metallocene catalyst, manufactured by Dow Chemical Company under the trade name of "VERSIFY 4301"

(B4) Ethylene/octene copolymer (having a block structure of ethylene/octene) having a melt index of 15 (g/10 minutes: 190° C.) which is obtained by polymerization using a metallocene catalyst, manufactured by Dow Chemical Company under the trade name of "INFUSE 9807"

(B5) Ethylene/octene copolymer (having a random copolymerization structure of ethylene/octene) having a melt index of 13 (g/10 minutes: 190° C.) obtained by polymerization using a metallocene catalyst, manufactured by Dow Chemical Company under the trade name of "ENGAGE 8137"

(B6) Ethylene/octene copolymer (having a random copolymerization structure of ethylene/octene) having a melt index of 500 (g/10 minutes: 190° C.) obtained by polymerization using a metallocene catalyst, manufactured by Dow Chemical Company under the trade name of "AFFINITY GA1950"

(B7) Propylene/ethylene copolymer "REXtac 2780A" (trade name), manufactured by Huntsman Corp., which is obtained by polymerization using a Ziegler-Natta catalyst (B8) Propylene/ethylene/butene copolymer obtained by polymerization using a Ziegler-Natta catalyst, manufactured by Evonik under the trade name of "VESTOPLAST 703"

(B9) Ethylene/vinyl acetate copolymer obtained by polymerization using a Ziegler-Natta catalyst, manufactured by TOSOH CORPORATION under the trade name of "Ultracene 722"

(B'10) Propylene/butene copolymer obtained by polymerization using a Ziegler-Natta catalyst, manufactured by Huntsman Corp. under the trade name of "REXtac 2780A"

(B'11) Acrylic copolymer, manufactured by Mitsubishi Rayon Co., Ltd. under the trade name of "BR-106"

(C) Tackifier resin (C1) Hydrogenated dicyclopentadiene-based resin, manufactured by Exxon Mobil Corporation under the trade name of "ECR179EX"

(C2) Hydrogenated dicyclopentadiene-based resin, manufactured by Exxon Mobil Corporation under the trade name of "ECR5400"

(C3) Hydrogenated cyclic aliphatic petroleum hydrocarbon resin manufactured by Arakawa Chemical Industries, Ltd. under the trade name of "Alcon M100"

(C4) Hydrogenated cyclic aliphatic petroleum hydrocarbon resin manufactured by Arakawa Chemical Industries, Ltd. under the trade name of "Alcon P100"

(C5) Unhydrogenated aliphatic aromatic copolymer-based resin manufactured by Zeon Corporation under the trade name of "Quintone DX390N"

(C6) Hydrogenated terpene-based resin manufactured by YASUHARA CHEMICAL CO., LTD. under the trade name of "Clearon M105"

(D) Oil (D1) Paraffin oil, manufactured by Idemitsu Kosan Co., Ltd. under the trade name of "DN Oil KP-68"

(D2) Paraffin oil, manufactured by SK LUBRICANTS under the trade name of "PHAZOL35"

(D3) Paraffin oil, manufactured by Idemitsu Kosan Co., Ltd. under the trade name of "Diana Process Oil PW-90"

(D4) Paraffin oil, manufactured by Idemitsu Kosan Co., Ltd. "Diana Fresia S32"

(D5) Naphthene oil, manufactured by Idemitsu Kosan Co., Ltd. under the trade name of "Process Oil NS100"

(D6) Naphthene oil, manufactured by PetroChina Company under the trade name "KN4010"

(E) Wax modified with carboxylic acid and/or carboxylic anhydride (E1) Maleic acid-modified wax, manufactured by Clariant K.K. under the trade name of "Licocene MA6252TP"

(E2) Fischer-Tropsch wax, manufactured by Sasol under the trade name of "Sasol Wax H-1"

(F) Antioxidant (F1) Hindered phenol-based antioxidant, manufactured by ADEKA Corporation under the trade name of "Adekastab AO-60"

These components (A) to (F) were blended according to the formulations shown in Tables 1 to 3, and then melt-mixed at about 150° C. over 2 hours using a universal stirrer to prepare hot melt adhesives of Examples 1 to 19 and Comparative Examples 1 to 9. All numerical values with respect to the composition (blend) of the hot melt adhesives shown in Tables 1 to 3 are parts by weight.

With respect to the respective hot melt adhesives (Examples and Comparative Examples), thermal stability, coatability, high-speed coatability and peel strength were evaluated. Summary of the respective evaluations is described below.

<Thermal Stability>

Thermal stability was evaluated based on the presence or absence of phase separation of the hot melt adhesive.

Each hot melt adhesive was charged in a glass bottle and left to stand at a temperature of 150° C. for 6 hours, and then it was visually observed whether or not phase separation occurs. The weight of each hot melt adhesive was from 350 to 400 g and a 450 ml volume glass bottle was used. The glass bottle charged with the hot melt adhesive was left to stand in a dryer after covering with a lid made of aluminum.

After a predetermine time, the hot melt adhesive was taken out, and the presence or absence of phase separation was visually confirmed quickly.

B: Phase separation was not recognized.

C: Phase separation was recognized.

<Measurement of Melt Viscosity (150° C.)>

The viscosity at 150° C. of each hot melt adhesive was measured in accordance with the method B defined in JAI7-1991. The measurement was carried out by a No. 27 rotor using a Brookfield viscometer.

<Coatability>

Using a spiral spray manufactured by Nordson Corporation, a coating base material was coated with a hot melt adhesive to produce a laminate of the coating base material and an affixing (or laminating) base material, and the coatability was evaluated, and also samples for the evaluation of the below-mentioned peel strength were produced. Both the coating base material and the affixing base material are polyethylene terephthalate (PET) films.

More specifically, the coating base material was coated with the hot melt adhesive under the conditions of a temperature of each of a hot melt tank and a spiral spray nozzle of 150° C., a temperature of hot air of 180° C., a pressure of hot air of 0.32 kgf/cm$^2$, a discharge amount of the hot melt adhesive of 15 g/minute (corresponding to a coating weight of 5 g/m$^2$), a distance between the nozzle and the coating base material of 35 mm, a transportation speed of the base material of 200 m/minute, an open time of 0.21 second, and a pressure upon pressing after coating of 2.0 kgf/cm to produce a laminate (PET film/PET film), and then the coatability was evaluated. The coatability was evaluated by confirming a coating width of the hot melt adhesive applied by spiral coating. Evaluation criteria are shown below.

A: Coating width was 15 mm or more.

B: Coating width was 12 mm or more and less than 15 mm.

C: Coating width was less than 12 mm.

<High-Speed Coatability>

Under the above-mentioned testing conditions of coatability, high-speed coatability was evaluated.

In the same manner as in the evaluation of coatability, except that the pressure of hot air was changed to 0.45 kgf/cm$^2$, a test was carried out. The high-speed coatability was visually evaluated. Evaluation criteria are as follows.

A: Scatter of the hot melt adhesive was not recognized.

B: Scatter of the hot melt adhesive was slightly recognized.

C: Pattern was not obtained because of scatter of the hot melt adhesive, or coating width of the hot melt adhesive was less than 15 mm.

<Peel Strength>

Using the same test conditions as in the high-speed coatability, samples of the peel strength were produced.

A conventional nonwoven fabric (SMS of 15 g/m$^2$, no surface treatment) was used as the coating base material, and two kinds of (1) a conventional nonwoven fabric (SMS of 15 g/m$^2$ no surface treatment) and (2) a conventional polyethylene film (no embossing, 30 g/m$^2$, no corona treatment) were used as an affixing base material.

After aging the samples in the atmosphere at 23° C. under 65% R.H. for 24 or more hours, a peel test was carried out under the same atmosphere. The peel test was carried out by Autograph AGS-J manufactured by Shimadzu Corporation under the following conditions.

Peel direction: direction which is the same as the direction of movement of the base material (MD) direction, distance between chucks: 20 mm, peel speed: 300 mm/minute Peel length: 50 mm, analysis method: average of testing force With each hot melt adhesive (Examples and Comparative Examples), at least three samples were produced and then measured. The peel strength was determined by the obtained average. The peel strength was evaluated by the following criteria:

(1) Base material to be affixed (or laminated) was a nonwoven fabric (nonwoven fabric/nonwoven fabric)

A: Peel strength was 2.0 N or more.

B: Peel strength was 0.5 N or more and less than 2.0 N.

C: Peel strength was less than 0.5 N.

(2) Base material to be affixed was a polyethylene film (polyethylene film/nonwoven fabric)
A: Peel strength was 0.20 N or more.
B: Peel strength was 0.10 N or more and less than 0.20 N.
C: Peel strength was less than 0.10 N.
<Appearance>
When an air-permeable polyethylene film is coated with a hot melt adhesive, a coating pattern of the hot melt adhesive applied inside may be sometimes seen through from an outside surface of the film. The hot melt adhesive whose coating pattern is conspicuous is not preferable in view of design properties of disposable products using an air-permeable film, and a hot melt adhesive whose coating pattern is inconspicuous is desired.

In order to evaluate whether or not a coating pattern is conspicuous, the evaluation was carried out by the following procedure.

A 50 μm thick PET film was coated with each hot melt adhesive to form a 50 μm thick adhesive layer, and then shaped into a form of 25×10 mm to obtain a test piece. The test piece was affixed (or pasted) to a commercially available air-permeable napkin (ELIS SHIN-SUHADAKAN, No Wing 20.5 cm, manufactured by ELLEAIR PAPER TECH CO., LTD.) and a weight of 1 kg was placed on the affixed part, followed by being left to stand in a dryer at 50° C. for 3 days. After a predetermine time, the weight was removed and change in appearance was confirmed. Evaluation criteria are as follows:

A: Applied hot melt adhesive was inconspicuous.
B: Applied hot melt adhesive was slightly seen through.
C: Applied hot melt adhesive was seen through.

TABLE 1

| | Examples | 1 | 2 | 3 | 4 | 5 | 6 | 7 | 8 | 9 | 10 | 11 |
|---|---|---|---|---|---|---|---|---|---|---|---|---|
| (A) | (A1) | | 23 | 33 | 47 | 86 | 33 | 33 | 75 | 38 | 40 | 75 |
| | (A2) | 80 | 66 | 50 | 31 | | 50 | 50 | | 38 | 40 | |
| | (A'3) | | | | | | | | | | | |
| | (A'4) | | | | | | | | | | | |
| | (A'5) | | | | | | | | | | | |
| (B) | (B1) | | | | | | | | 17 | | | |
| | (B2) | 20 | 11 | 17 | 22 | 14 | | | | | | |
| | (B3) | | | | | | 17 | | | | | |
| | (B4) | | | | | | | | | | | |
| | (B5) | | | | | | | | | 25 | | |
| | (B6) | | | | | | | | | | | |
| | (B7) | | | | | | | | | 24 | | |
| | (B8) | | | | | | | | | | 20 | |
| | (B9) | | | | | | | | | | | 25 |
| | (B'11) | | | | | | | | | | | |
| | (B'12) | | | | | | | | | | | |
| (C) | (C1) | | | | | | | 140 | 25 | | | |
| | (C2) | | 66 | 130 | 63 | | 130 | | | 24 | | |
| | (C3) | | | | | 60 | | | | | 20 | |
| | (C4) | | | | 60 | | | | | | | 25 |
| | (C5) | 180 | 63 | | | | | | | | | |
| | (C6) | | | | | | | | | | | |
| (D) | (D1) | | | | | | | | 50 | | | |
| | (D2) | | | | | | | | | | 40 | |
| | (D3) | 120 | | | 31 | | | | | | | 50 |
| | (D4) | | 33 | | | 40 | | | | | | |
| | (D5) | | | | 56 | | | | 90 | | 50 | |
| | (D6) | | 66 | 100 | | | 100 | | | | | |
| (E) | (E1) | | 3 | 3 | 3 | | 3 | 3 | 3 | | | 3 |
| | (E2) | | | | | | | | | | 2 | |
| (F) | (F1) | 1 | 1 | 1 | 1 | 1 | 1 | 1 | 1 | 1 | 1 | 1 |
| Thermal stability | | B | B | B | B | B | B | B | B | B | B | B |
| Coatability | | A | A | A | A | B | B | A | A | A | A | A |
| Coating width (mm) | | 17 | 17 | 15 | 15 | 14 | 13 | 15 | 15 | 17 | 17 | 17 |
| Melt viscosity at 150° C. (m·Pas) | | 2,250 | 2,380 | 3,380 | 3,950 | 5,450 | 3,380 | 2,700 | 5,010 | 2,500 | 4,450 | 1,880 |
| High-speed coatability | | B | B | A | A | A | A | B | B | B | B | B |
| Scatter of hot melt adhesive | | B | B | A | A | A | A | B | B | B | B | B |
| Coating width (mm) | | 20 | 18 | 17 | 17 | 16 | 16 | 20 | 17 | 18 | 18 | 19 |
| Peel strength | | | | | | | | | | | | |
| (1) Lamination Nonwoven fabric | | B | B | A | A | B | A | A | B | B | B | B |
| Peel strength (N) | | 1.20 | 1.71 | 2.63 | 3.40 | 0.63 | 3.23 | 3.34 | 1.84 | 1.99 | 1.43 | 1.85 |
| Peel state | | Cohesive fracture | Cohesive fracture | Material fracture | Material fracture | Cohesive fracture | Material fracture | Material fracture | Cohesive fracture | Material fracture | Cohesive fracture | Material fracture |
| (1) Lamination Polyethylene film | | A | A | A | A | B | B | B | A | B | B | B |
| Peel strength (N) | | 0.60 | 0.45 | 0.22 | 0.34 | 0.11 | 0.12 | 0.18 | 0.38 | 0.10 | 0.14 | 0.19 |
| Peel state | | Interfacial peel | Interfacial peel | Interfacial peel | Interfacial peel | Interfacial peel | Interfacial peel | Interfacial peel | Interfacial peel | Interfacial peel | Interfacial peel | Interfacial peel |

TABLE 2

| Comparative Examples | | 1 | 2 | 3 | 4 | 5 | 7 | 8 | 9 |
|---|---|---|---|---|---|---|---|---|---|
| (A) | (A1) | 50 | | | | | 100 | | |
| | (A2) | | 50 | | | | | 100 | |
| | (A'3) | | | | | 90 | | | |
| | (A'4) | | | 50 | | | | | |
| | (A'5) | | | | 50 | | | | |
| (B) | (B1) | | | | | | | | |
| | (B2) | | | 50 | | | | | 100 |
| | (B3) | | | | | | | | |
| | (B4) | | | | 50 | 10 | | | |
| | (B5) | | | | | | | | |
| | (B6) | | | | | | | | |
| | (B7) | | | | | | | | |
| | (B8) | | | | | | | | |
| | (B9) | | | | | | | | |
| | (B'11) | 50 | | | | | | | |
| | (B'12) | | 50 | | | | | | |
| (C) | (C1) | 80 | | | | | | | |
| | (C2) | | 20 | | | | | | |
| | (C3) | | | 40 | | | | | |
| | (C4) | | | | 20 | | | 150 | |
| | (C5) | | | | | | 50 | | |
| | (C6) | | | | | | | | 100 |
| (D) | (D1) | 20 | | | | | | 150 | |
| | (D2) | | | 60 | | 40 | | | |
| | (D3) | | | | | | 50 | | |
| | (D4) | | | | | | | | 50 |
| | (D5) | | 60 | | | | | | |
| | (D6) | | | | 80 | | | | |
| (E) | (E1) | | | | | | | | |
| | (E2) | | | | | | | | |
| (F) | (F1) | 2 | 2 | 2 | 2 | 1 | 2 | 2 | 2 |
| Thermal stability | | B | C | B | C | C | B | B | B |
| Coatability | | C | C | C | — | — | A | B | C |
| Coating width (mm) | | 10 | — | 10 | — | — | 17 | 22 | 10 |
| Melt viscosity at 150° C. (m · Pas) | | 4,310 | 6,510 | 59,800 | 5,700 | 230 | 2,240 | 1,120 | 116,750 |
| High-speed coatability | | C | — | C | — | — | B | B | C |
| Scatter of hot melt adhesive | | B | — | B | — | — | B | C | A |
| Coating width (mm) | | 11 | — | 11 | — | — | 20 | 22 | 11 |
| Peel strength | | | | | | | | | |
| (1) Lamination Nonwoven fabric | | A | — | A | — | — | B | C | — |
| Peel strength (N) | | 3.66 | — | 1.33 | — | — | 0.74 | 0.40 | — |
| Peel state | | Material fracture | — | Cohesive fracture | — | — | Cohesive fracture | Cohesive fracture | — |
| (1) Lamination Polyethylene film | | C | — | A | — | — | C | B | — |
| Peel strength (N) | | 0.07 | — | 0.32 | — | — | 0.09 | 0.21 | — |
| Peel state | | Interfacial peel | — | Interfacial peel | — | — | Interfacial peel | Interfacial peel | — |

As shown in Table 1, the hot melt adhesives of Examples 1 to 11 are excellent in thermal stability, coatability and high-speed coatability, and are also excellent in peel strength to a nonwoven fabric, and are therefore suitable for use in disposable products using a nonwoven fabric, such as a diaper and a napkin.

In contrast, the hot melt adhesives of Comparative Examples 1 to 9 are inferior in any one of the above performances, as shown in Table 2.

TABLE 3

| Examples | | 12 | 13 | 14 | 15 | 16 | 17 | 18 | 19 |
|---|---|---|---|---|---|---|---|---|---|
| (A) | (A1) | 94 | 90 | 80 | 80 | 75 | 70 | 75 | 60 |
| | (A2) | | | | | | | | |
| | (A'3) | | | | | | | | |
| | (A'4) | | | | | | | | |
| | (A'5) | | | | | | | | |

TABLE 3-continued

| Examples | | 12 | 13 | 14 | 15 | 16 | 17 | 18 | 19 |
|---|---|---|---|---|---|---|---|---|---|
| (B) | (B1) | | | | | | | | |
| | (B2) | | | | | | | | |
| | (B3) | | | | | | | | |
| | (B4) | 6 | 10 | 20 | 20 | 25 | 30 | | |
| | (B5) | | | | | | | 25 | |
| | (B6) | | | | | | | | 40 |
| | (B7) | | | | | | | | |
| | (B8) | | | | | | | | |
| | (B9) | | | | | | | | |
| | (B'11) | | | | | | | | |
| | (B'12) | | | | | | | | |
| (C) | (C1) | 60 | | | 80 | | | | |
| | (C2) | | | 40 | | | | | |
| | (C3) | | 60 | | | | | | |
| | (C4) | | | | | 100 | | 85 | |
| | (C5) | | 35 | | | | | | |
| | (C6) | | | | | | 100 | | 60 |
| (D) | (D1) | | | 45 | | | | | |
| | (D2) | | | | 40 | | | 50 | |
| | (D3) | 40 | | | | | | | 40 |
| | (D4) | | | | | 50 | | | |
| | (D5) | | 40 | | | | | | |
| | (D6) | | | | | | 50 | | |
| (E) | (E1) | | | 3 | 3 | | | | |
| | (E2) | | | | | | | 15 | |
| (F) | (F1) | 2 | 2 | 4 | 2 | 2 | 2 | 2 | 2 |
| Thermal stability | | B | B | B | B | B | B | B | B |
| Coatability | | A | A | A | A | A | B | A | A |
| Coating width (mm) | | 20 | 20 | 15 | 15 | 15 | 14 | 16 | 17 |
| Melt viscosity at 150° C. (m · Pas) | | 3,500 | 3,630 | 4,380 | 5,560 | 3,740 | 5,990 | 3,250 | 3,210 |
| High-speed coatability | | B | B | A | A | A | A | A | B |
| Scatter of hot melt adhesive | | B | B | A | A | A | A | A | B |
| Coating width (mm) | | 20 | 20 | 17 | 16 | 17 | 19 | 19 | 18 |
| Peel strength | | | | | | | | | |
| (1) Lamination Nonwoven fabric | | A | A | A | A | A | A | A | B |
| Peel strength (N) | | 2.88 | 3.29 | 3.05 | 3.98 | 2.48 | 4.53 | 3.90 | 0.80 |
| Peel state | | Material fracture | Material fracture | Material fracture | Material fracture | Material fracture | Material fracture | Material fracture | Material fracture |
| (1) Lamination Polyethylene film | | B | B | A | A | A | A | A | B |
| Peel strength (N) | | 0.10 | 0.13 | 0.22 | 0.40 | 0.58 | 0.34 | 0.40 | 0.41 |
| Peel state | | Interfacial peel | Interfacial peel | Interfacial peel | Interfacial peel | Interfacial peel | Interfacial peel | Interfacial peel | Interfacial peel |
| Appearance | | A | A | A | A | A | A | A | A |

As shown in Table 3, the hot melt adhesives of Examples 12 to 19 not only have the above-mentioned satisfactory performances, but also a pattern after coating is inconspicuous. Taking design properties of disposable products using an air-permeable film into consideration, the hot melt adhesives of Examples 12 to 19 are extremely excellent for disposable products.

INDUSTRIAL APPLICABILITY

The present invention provides a hot melt adhesive. The hot melt adhesive according to the present invention is suited for disposable products.

The invention claimed is:
1. A hot melt adhesive comprising:
 (A) a propylene homopolymer having a melting point of 100° C. or lower which is prepared by polymerizing propylene using a metallocene catalyst; and
 (B) an ethylene/α-olefin copolymer prepared with a metallocene catalyst,
wherein the ethylene/α-olefin copolymer is ethylene/propylene copolymer and/or ethylene/octene copolymer.
2. The hot melt adhesive of claim 1, wherein the propylene homopolymer has a melting point of 65° C. to 85° C.
3. The hot melt adhesive of claim 1, wherein the propylene homopolymer is a mixture of a (A1) propylene homopolymer having a weight average molecular weight of 60,000 or less and a (A2) propylene homopolymer having a weight average molecular weight greater than 60,000.
4. The hot melt adhesive of claim 3, wherein the propylene homopolymer is a mixture of a (A1) propylene homopolymer having a weight average molecular weight of 30,000 to 55,000 and a (A2) propylene homopolymer having a weight average molecular weight of 60,000 to 80,000.
5. The hot melt adhesive of claim 4, wherein the propylene homopolymer comprises a mixture of a (A1) propylene homopolymer and a (A2) propylene homopolymer in a ratio of 1:3 to 3:2.
6. The hot melt adhesive of claim 1, wherein the propylene homopolymer is present at 60 to 95 parts by weight based on the 100 parts by weight of the total weight of the propylene homopolymer (A) and the ethylene/α-olefin copolymer (B).

7. The hot melt adhesive of claim 1, wherein the ethylene/α-olefin copolymer has a melt index of 10 to 50 g/10 minutes at 230° C.

8. The hot melt adhesive of claim 7, wherein the ethylene/α-olefin copolymer has a melt index of 20 to 30 g/10 minutes at 230° C.

9. The hot melt adhesive of claim 1, further comprising 60 to 150 parts by weight, based on 100 parts by weight of the total weight of the propylene homopolymer and ethylene/α-olefin copolymer, of (C) a tackifier resin.

10. The hot melt adhesive of claim 1, wherein the tackifier is a hydrogenated dicyclopentadiene-based resin.

11. The hot melt adhesive of claim 1, further comprising a (D) oil.

12. The hot melt adhesive of claim 1, further comprising a (E) wax.

13. The hot melt adhesive of claim 12 wherein the wax is an olefin wax modified with carboxylic acid or carboxylic anhydride.

14. The hot melt adhesive of claim 13, wherein the olefin wax is selected from the group consisting of polyethylene wax, polypropylene wax, polyethylene/polypropylene wax, polyethylene/polybutylene wax, polyethylene/polybutene wax, and mixtures thereof.

15. The hot melt adhesive of claim 13, wherein the wax has an acid value of 20 to 160 mgKOH/g.

16. The hot melt adhesive of claim 1, further comprising a stabilizing agent, ultraviolet absorber, filler and/or antioxidant.

17. The hot melt adhesive of claim 1 wherein the adhesive has a melt viscosity of 7,000 mPa·s or less at 150° C.

18. An article comprising the hot melt adhesive of claim 1.

19. The article of claim 18 further comprising a substrate selected from tissue, cotton, nonwoven fabric or polyolefin film.

20. The article of claim 18, which is a diaper, sanitary napkin, pet sheet, hospital gown or surgical garment.

21. The hot melt adhesive of claim 1, wherein the ethylene/α-olefin copolymer is ethylene/propylene copolymer.

22. The hot melt adhesive of claim 1, wherein the ethylene/α-olefin copolymer is ethylene/octene copolymer.

23. The hot melt adhesive of claim 1, wherein the ethylene/α-olefin copolymer is ethylene/propylene copolymer and ethylene/octene copolymer.

* * * * *